United States Patent Office 3,545,923
Patented Dec. 8, 1970

3,545,923
PREPARATION OF ALUMINUM TRIHYDRATE CRYSTALS
Henri Mercier and Joseph Cohen, Gardanne, France, assignors to Pechiney, Compagnie de Produits Chimiques et Electrometallurgiques, Paris, France
Filed Feb. 12, 1968, Ser. No. 704,685
Claims priority, application France, Feb. 17, 1967, 95,297
Int. Cl. C01f 7/02, 7/04
U.S. Cl. 23—143                14 Claims

ABSTRACT OF THE DISCLOSURE

A process for the preparation of crystals of aluminum trihydrate by hydrolysis of solutions of sodium aluminate of the type obtained by leaching bauxite with alkaline solutions in which fine seed crystals are formed by decomposition of a dilute solution of sodium aluminate in the presence of alumina gel, decomposing a first portion of a concentrated solution of sodium aluminate in the presence of the seed crystals, separating the crystals of trihydrate from this first portion of sodium aluminate subjected to decomposition, decomposing a second portion of concentrated solution of sodium aluminate in the presence of the crystals separated from the first portion, separating the trihydrate crystals from the second portion of sodium aluminate subjected to decomposition and continuing the use of the trihydrate crystals separated from previous decompositions for seed with a fresh portion of sodium aluminate solution until the grains of trihydrate are of the desired dimension after which they are separated as product.

---

This invention relates to the preparation of aluminum trihydrate by decomposition of sodium aluminate solutions by the Bayer process.

Briefly described, the process comprises:

(a) Preparation of very fine seed crystals from a dilute solution of sodium aluminate and alumina gel, and (b) Progressively enriching the seed crystals by progressive exposure to fresh increments of sodium aluminate solution until crystals of the desired dimension are obtained.

Alumina intended for use in the manufacture of aluminum, refractories, corundum or special aluminum oxides is generally prepared by the action of alkali on bauxites by the Bayer process. It consists of dissolving the alumina from the bauxite with heat by means of an aqueous solution of sodium hydroxide and sodium aluminate. The solution, saturated in alumina, is reduced in temperature and freed of insoluble material (Fe, Si, Ti, etc.) by decantation and filtration. It is then subjected to a hydrolysis, called "decomposition," during which the trihydrate $Al_2O_3 \cdot 3H_2O$ precipitates. This operation is carried out in the presence of seed crystals of the trihydrate. To facilitate the decomposition operation, the solution from the bauxite leach is diluted with liquors used to wash the insolubles which therefore constitute dilute solutions of sodium hydroxide and alumina.

The mechanism of the decomposition is not entirely clear. Amongst the factors that have influence on the decomposition in industrial practice, the more important are: the concentration of alumina and caustic soda in the solution; the weight ratio of alumina and caustic soda; the temperature of the solution, the nature and the quantity of the seed crystals.

In order to improve the decomposition operation, others have sought to increase the activity of the seed by increasing its surface area. The conventional process consists of separating the finest grains during the production of alumina for re-introduction as seed. However, this practice has the disadvantage of necessitating the recycling of very large quantities of aluminum hydrate, which may range up to ten times the quantity of trihydrate produced.

Various investigators have provided ways of preparing a seed having higher activity. For example, the intense cooling of an aluminate solution has been proposed until it solidifies, followed by reheating, during which microcrystals of hydrargillite are obtained. These micro-crystals, when used as seed, cause rapid decomposition of the aluminate solutions.

Others proposed preparing an active seed crystal by sudden dilution of a concentrated aluminate liquor. Finally, for the formation of active nuclei, others have used partially dehydrated alumina grains originating from the removal of dust from the gases exhausted from calcining surfaces for aluminum oxide.

The industrial uses of these products having large surface have led to a number of technical problems. Some are due to the very wide grain size distribution of the fine alumina which results in an extremely slow and frequently incomplete decantation and filtration operation.

It is an object of this invention to provide a process for the preparation of aluminum trihydrate by decomposition of sodium aluminate solutions in a manner which obviates the problems heretofore encountered, which yields aluminum trihydrate crystals of relatively uniform grain size, which is capable of efficient operation and production with lesser equipment and with lesser handling of materials, and which offers a good yield of a more uniform product.

These and other objects and advantages of this invention will hereinafter appear and for purposes of illustration, but not of limitation, an embodiment of the invention is shown in the accompanying drawings in which—

The process of the present invention consists in producing trihydrate seed crystals which are extremely fine but easy to filter by reason of their relatively uniform grain size:

Using the seed with only a part of the aluminate solution to be treated for decomposition to produce a much larger quantity of trihydrate, the dimensions of which are larger than those of the original seed crystals;

Using the trihydrate crystals with a further part of the aluminate solution to be treated for decomposition, and so on.

At each stage, considerable enlargement of the trihydrate grains occurs, although the dimensions thereof remain somewhat uniform. The number of decomposition stages, the initial quantity of seed and its grain size, are variable parameters by which it is possible to regulate the accuracy and the size of the aluminum trihydroxide that is produced.

The process of this invention has considerable advantage by comparison with the usual procedure of recycling a part of the production alumina. Because of the fairly weak activity of this alumina, when used as seed, extremely large quantities are required. This necessitates a very large volume of decomposers and it immobilizes a large quantity of alumina in the processing apparatus. A quantity of alumina, which may be two to ten times greater than the quantity actually produced, has to be drawn off from the decomposers, filtered and re-introduced into the apparatus. All of these operations, coupled with the immobilization of apparatus and material, are exteremly troublesome and uneconomical.

On the other hand, in the process of this invention, only a quantity of alumina which is one and one-half to two times greater than that which is actually produced has to be filtered. That is to say, for the purpose of preparing one ton of alumina, only one and one-half to two tons of alumina has to be filtered instead of the three to eleven times representative of prior practice. The capacity of the apparatus and the immobilization of material can be reduced in somewhat the same proportions. Furthermore, since the initial seed is continuously remade from new gels, progressive decrease in activity of the alumina as seed is not observed, which otherwise results from the aging of the trihydrate in the prior process.

One of the features of this invention is the method for preparing extremely fine and homogeneous alumina to be used as initial seed crystals. This method consists in producing the seed crystals by the action of alumina gels on a dilute solution of sodium hydroxide and sodium aluminate.

Another feature is the progressive increase in size of the seed nuclei by successive decomposition stages, as indicated above.

Figure 1:
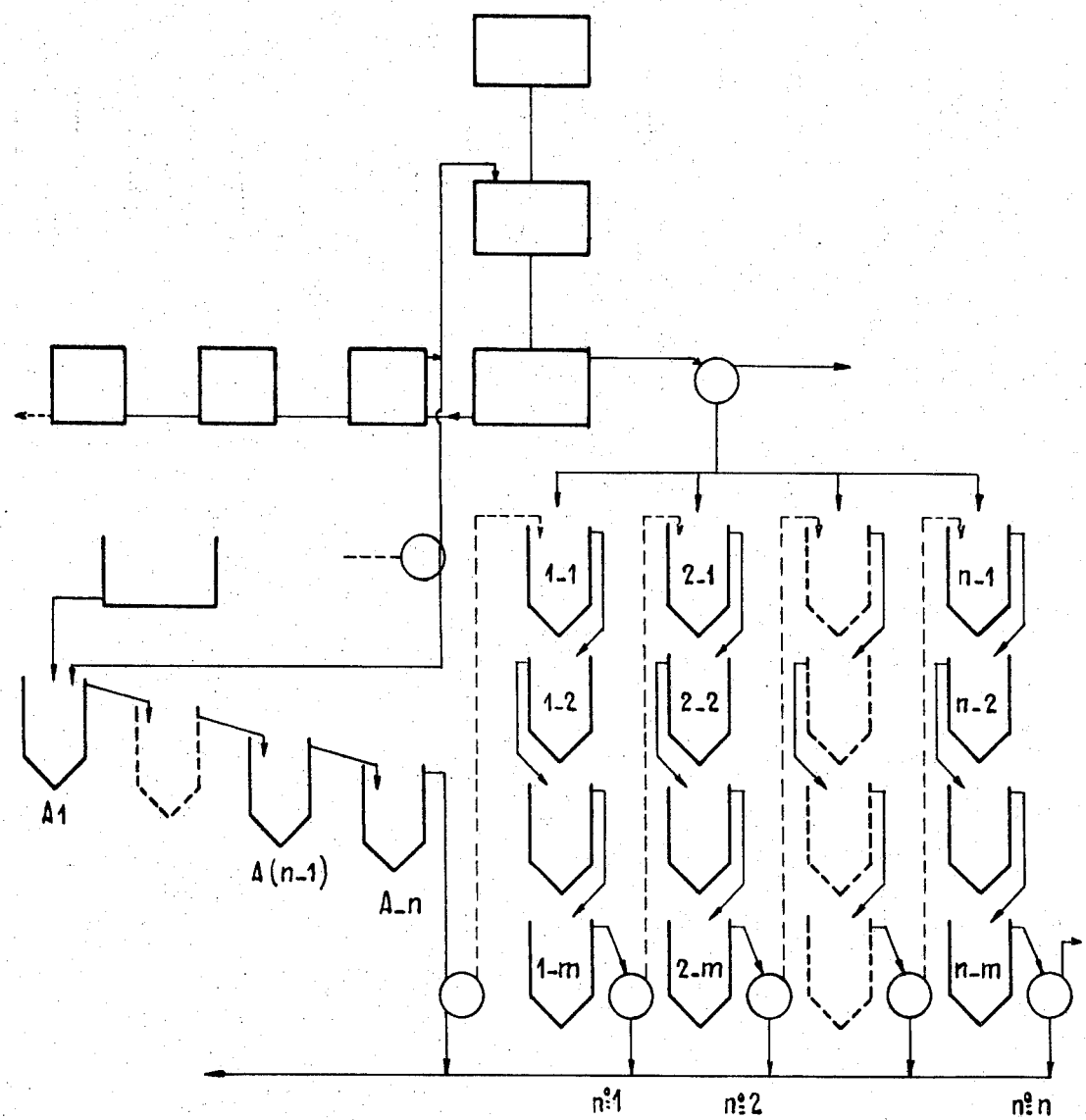
FIG. 1 is a flow diagram illustrating the process of this invention.

The entire process is illustrated diagrammatically in FIG. 1 which is given by way of illustration, since it is obvious that modifications as regards to details can be incorporated without departing from the spirit of the invention. The figures, with reference to volumes and weights hereinafter given, are for the production of one ton of alumina $Al_2O_3$ from solutions prepared by the Bayer process.

The concentrated solution from the attack of bauxite in the autoclaves is diluted with the dilute solution from the first washing stage of the red muds. The volume of the dilute washing liquor is of the order of 6 cubic meters, and caustic soda is present in an amount between 50 and 100 grams of $Na_2O$ per liter and the weight ratio

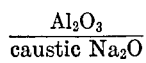

$$\frac{Al_2O_3}{\text{caustic } Na_2O}$$

is between 0.8 and 1.1, and generally in the region of 1:1. A portion of this wash solution is withdrawn for use in preparation of the fine seed and the remainder serves for the dilution of the concentrated solution from the autoclaves, as previously described.

(a) PREPARATION OF THE FINE INITIAL SEED

The fraction of washing liquors drawn off for the preparation of seed represents from 4–16% of the volume of the dilute wash solution. After filtration, it is subjected to the action of an alumina gel at a constant temperature within the range of 30°–80° C. The gel can be obtained by various known conventional procedures. Preferably it is prepared by continuous neutralization of a solution of sodium aluminate containing from 40–80 grams of $Al_2O_3$ per liter, by means of a mineral acid, such as $H_2SO_4$, HCl, $HNO_3$ or $H_2CO_3$. The gel is decanted, centrifuged, washed with water and finally centrifuged.

0.5 to 10 grams, and preferably 1 to 7 grams, of moist gel (i.e. from 0.05 to 1.2 and preferably 0.1 to 0.8 g. of $Al_2O_3$) are introduced per liter of solution to be decomposed.

Thus, in the preparation of the seed crystals, the dilute solution from which the initial seed crystals are prepared in the presence of alumina gel contains 50–100 g. $Na_2O$ per liter and 50–110 g. of $Al_2O_3$ per liter. The decomposition is effected with constant stirring while at a constant temperature within the range of 30°–80° C. After a while, such as between 10 and 100 hours and preferably in the order of 30 to 48 hours, the aluminum hydroxide is separated from the solution which is recycled for the operation of attack on bauxite. The separated aluminum hydroxide is characterized by a high degree of fineness and a very narrow grain size distribution range. As a result, it can be easily separated by filtration and has a remarkable activity as a seed. The grain size of the seed is a function of the proportion of the gel used.

The quantity of seed crystals, expressed as $Al_2O_3$, is several tens or hundreds of times greater than that of the gel, so that a few tens or hundreds of grams of alumina ($Al_2O_3$) in gel form are sufficient for preparation of seed crystals for the manufacture of one ton of alumina.

(b) DECOMPOSITION OF THE ALUMINATE SOLUTION

The solution from the autoclaves is diluted with 84–96% of the volume of the washing liquors of the red muds and the insoluble substances are separated out by decantation while the remainder is removed by filtration. The volume is between 11 and 14 cubic meters and the concentration of caustic $Na_2O$ is from 120 to 170 grams per liter and preferably from 145 to 165 grams per liter, with the caustic soda ratio being between 0.9 and 1.15 and preferably between 1 and 1.10. This solution is continuously distributed to the various stages where decomposition is effected. Each of these stages has a certain number of containers in cascade arrangement, in which the suspension undergoing treatment is agitated and continuously advanced from one container to the following container. The decomposition is carried out at a temperature within the range of 30°–70° C. and preferably in the region of about 50° C. (i.e. 45–50° C.). The fine seed crystal and a fraction of the solution to be decomposed are continuously mixed in the upper containers of the first stage (1–1). At the bottom of this cascade (1–m), the alumina is separated from the decomposed solution by decantation and/or filtration. The solution is returned to the bauxite-attacking circuit. The residence time of the suspension in the first stage is between 10 and 100 hours and preferably in the region of about 48 hours such as within the range of 30–50 hours.

The separated grains of hydroxide, which are decidedly larger than the fine seed crystals, are continuously supplied to the second stage of decomposition (2–1) for admixture with another fraction of the rich solution to be decomposed. The decomposition is carried out under conditions similar to those of the first stage. The hydroxide separated at the end of the second stage is coarser or larger in grain size than that from the first stage. The decomposition is continued in this way through the $n$ stages of the decomposition battery.

The grain size of the trihydrate from the last stage depends somewhat on the dimensions and on the quantity of the initial seed, the number of stages, and also the proportion of the solution to be decomposed, which is supplied to each of the stages.

Best results are obtained when the volume of rich solution to be decomposed increases from one stage to the next.

The washed and filtered hydroxide from the last stage represents one ton of alumina and it is calcined in its entirety.

The process of this invention permits selection and accurate control of the size of alumina obtained. In the continuous operation cycle, climatic conditions have very little influence on the grain size of the aluminum hydroxide. This is not the case for the alumina obtained by the prior processes.

In the following examples, which are given for purposes of illustration, but not by way of limitation, industrial solutions of aluminate produced by the Bayer process are treated. They contain all the usual impurities which originate from the attack on the bauxite ($CO_2$, $P_2O_5$, $V_2O_5$, etc.). All of the weights and all of the volumes given in the examples relate to the production of one metric ton of alumina ($Al_2O_3$).

EXAMPLE 1

Figure 2:
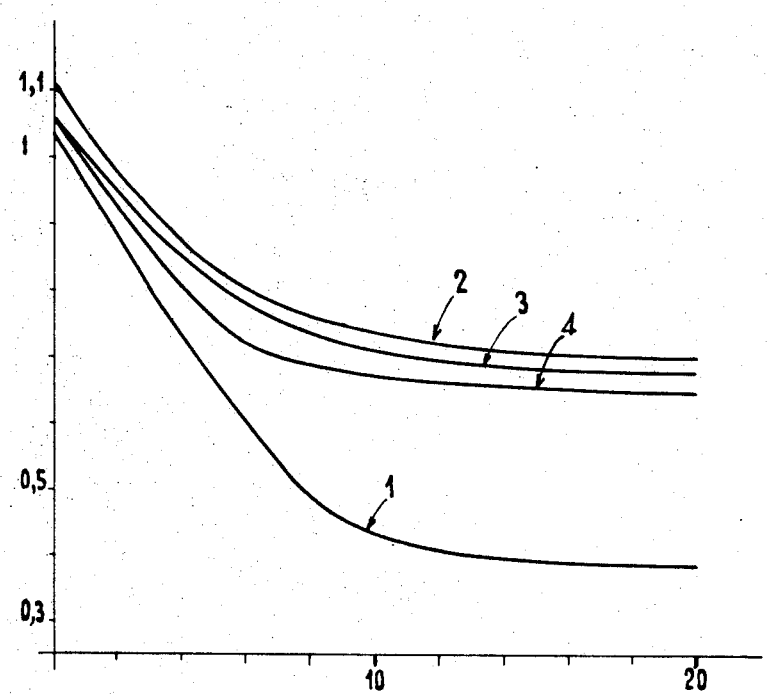
FIGS. 2, 3 and 4 are curves which represent the decomposition kinetics of the various stages of operation of the examples.

0.339 cubic meter of filtered liquid, containing 81.5 grams per liter of caustic soda, expressed as $Na_2O$, is withdrawn from the washing water of the red muds between the washing plant and the dilution tank after attack. The weight ratio $$\frac{Al_2O_3}{\text{caustic } NaO_2}$$

is 1.03. This liquid is advanced continuously at a temperature of 35° C. in a series of decomposition tanks (A–1 to A–$n$). At the entrance to the first apparatus (A–1) addition is made of 1 gram per liter of alumina gel, i.e. 0.120 gram of $Al_2O_3$. The mean residence time of the suspension in the series is 48 hours. Aluminum hydroxide seed crystals are obtained having a grain size within the range of 1.3 to 3 microns. The amount of hydroxide corresponds to 18.45 kg. of alumina, i.e. 454 times the quantity of alumina introduced in gel form. The curve 1 of FIG. 2 represents the kinetics of the decomposition of the aluminate by the alumina gel.

Despite its extreme fineness, but because of the uniformity in the dimension of the grains, the hydrate is very easy to filter. After filtration, all of the hydroxide is used for seeding the continuous decomposition of 1.42 cubic meters of rich aluminate solution in a first battery of decomposers arranged in series (1–1 to 1–$m$) in a first stage of decomposition. The solution to be decomposed contains 163.5 grams of caustic $Na_2O$ and the weight ratio $$\frac{Al_2O_3}{\text{caustic } Na_2O}$$

is 1.05.

In this first stage, as in the following stages, the temperature of the suspension is maintained at about 50° C. and the mean residence time is 48 hours. The hydroxide mass collected at the end of the first stage corresponds to 100 kg. of alumina ($Al_2O_3$), i.e. 6.5 times that of the seed crystals. 95% of this mass is formed of grains having a diameter between 5 and 17 microns. The hydrate is easily separated from the decomposed liquor and the latter is returned to the bauxite-attacking circuit.

The alumina collected in the first stage is advanced to the second stage for seeding the composition of a new fraction of rich solution in the second series of decomposers (2–1 to 2–$m$). 3.99 cubic meters of the solution to be decomposed, which is substantially the same as that fed to the first stage having 164 grams per liter of caustic $Na_2O$ and the caustic soda ratio of 1.05 are introduced with the seed to the second stage (2–1).

The conditions as regards temperature and duration are the same as in the first stage. A trihydrate is obtained which corresponds to 415 kg. of $Al_2O_3$ or 3.46 times the mass of seed crystals and 90% are grains having a diameter within the range of 6 to 35 microns.

The alumina obtained at the end of the second stage is used for seeding the decomposition of a new fraction of rich solution in the third and last decomposer stage (3–1 to 3–$m$). 7.38 cubic meters of solution having 159 grams per liter of caustic $Na_2O$ and a caustic soda weight ratio of 1.11 are treated in the third stage. The conditions, as regards temperature and residence time, are the same as in the two preceding stages. The hydrate collected at the end of the last stage corresponds to one ton of alumina ($Al_2O_3$) or 2.41 times the quantity of seed crystals fed to the stage. 90% of the hydrate are grains having a diameter within the range of 30 to 80 microns.

The curves 2, 3 and 4 represent the decomposition kinetics of stages 1, 2 and 3, respectively. This example shows that 40 grams of alumina in the form of a starting gel are sufficient to produce one ton of alumina ($Al_2O_3$). Decomposition is carried out with 0.339 cubic meter of dilute liquor originating from the first washing stage of the muds, then 1.42 +3.99+7.38, or 12.79 cubic meters of rich, diluted, decanted and filtered aluminate solution. Thus, for the protection of one ton of alumina, it was necessary to filter only 18.45+100+415+1000, or 1,553.45 kg. of alumina ($Al_2O_3$), in trihydrate form. This represents a very considerable savings in volume of decomposers, in the amount of filtering installations and immobilization of alumina by comparison with the prior art.

EXAMPLE 2

Figure 3:
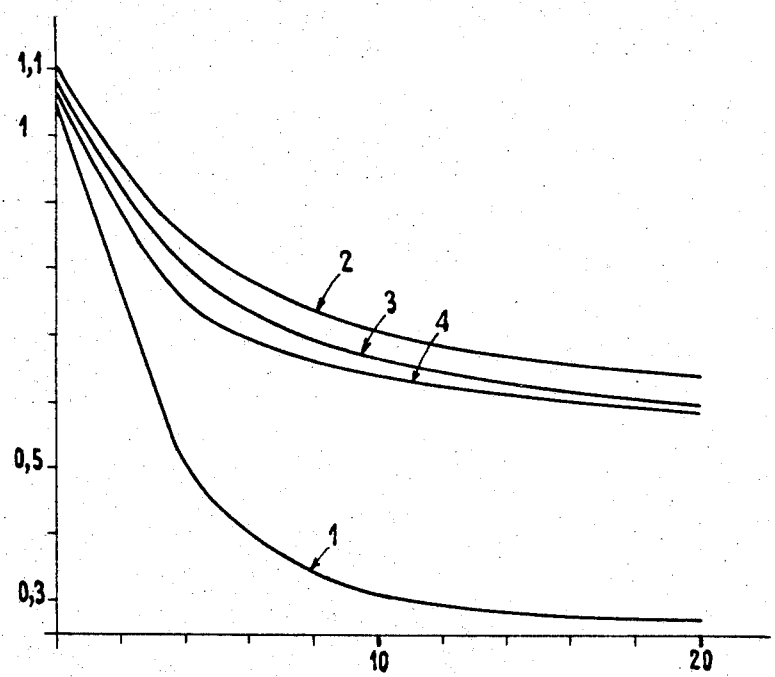

1 cubic meter of filtered liquid containing 70.8 grams per liter of caustic soda, expressed as $Na_2O$, is withdrawn from the washing water of the red muds between the washing plant and the dilution tank after attack. The weight ratio $$\frac{Al_2O_3}{\text{caustic } Na_2O}$$

is 1.015. This liquid, at a temperature of 40° C., is circulated continuously through a series of decomposer tanks. At the entry to the first tank, there is added 3 grams of alumina gel per liter of solution, i.e. 0.360 gram of $Al_2O_3$. The mean residence time of the suspension in the battery of decomposer tanks is 30 hours. Hydroxide grains having a dimension within the range of 2 and 3.5 microns are obtained. The quantity of hydroxide obtained corresponds to 51 kg. of alumina, or 141 times the quantity of alumina introduced in gel form. The curve 1 of FIG. 3 represents the kinetics of the decomposition of the aluminate by the alumina gel.

Despite its extreme fineness but because of uniformity in grain size, the hydrate produced is very easy to filter. After filtration, all of the hydroxide is fed as seed for the continuous decomposition of 2.80 cubic meters of rich aluminate solution in a battery of decomposers which form the first stage of the decomposition. The solution to be decomposed contains 162 grams of caustic $Na_2O$ and the weight ratio $$\frac{Al_2O_3}{\text{caustic } Na_2O}$$

is 1.07.

In this first stage, as in the following stages, the temperature of the suspension is maintained at about 50° C. and the mean residence time is 48 hours. The hydroxide mass collected at the end of the first stage corresponds to 283 kg. of alumina ($Al_2O_3$) or 5.55 times that of the seed crystals. 95% of this mass are grains having a diameter within the range of 5 to 13 microns. This hydrate is easily separated from the decomposed liquor and the latter is returned to the bauxite-attacking circuit.

All of the alumina collected in the first stage is used for seeding the decomposition of a new fraction of rich solution in the second decomposer stage.

3.86 cubic meters of solution containing 161 grams per liter of caustic $Na_2O$ and a caustic soda weight ratio of 1.08 are treated in the second stage. The conditions, as regards temperature and duration, are the same as in the first stage. Trihydrate is obtained at the end of the second stage corresponding to 623 kg. of $Al_2O_3$ or 2.2 times the mass of the seed crystals fed to the second stage. 90% of this mass are grains which are of a diameter within the range of 7 to 19 microns.

All of the alumina obtained in the second stage is used for seeding the decomposition of a new fraction of rich solution in the third and last decomposer stage.

4.57 cubic meters of solution containing 164 grams per liter of caustic $Na_2O$ and a caustic soda weight ratio of 1.055 are treated in the third stage. The conditions, as regards temperature and residence time, are the same as in the two preceding stages. The hydrate collected at the outlet from this last stage corresponds to one ton of alumina ($Al_2O_3$) or 1.6 times the quantity of the seed. 95% is formed of grains having a diameter within the range of 10 to 26 microns.

The curves 2, 3 and 4 of FIG. 3 represent the decomposition kinetics of each stage 1, 2 and 3, respectively. This example shows that 360 grams of alumina, in the form of a starting gel, are sufficient to produce one ton of alumina ($Al_2O_3$). It was necessary to subject to decomposition 1 cubic meter of dilute liquor originating from the first washing stage of the muds, then 2.8+3.86+4.57, or 11.23 cubic meters of rich, diluted, decanted and filtered aluminate solution.

For one metric ton of alumina, it was necessary to filter 51+283+623+1000, or 1957 kg. of alumina ($Al_2O_3$) in trihydrate form. This represents a very considerable savings in volume of decomposers, in filtering installations and in immobilized alumina by comparison with the prior art processes.

EXAMPLE 3

0.98 cubic meter of filtered liquid containing 70.8 grams per liter of caustic soda, expressed as $Na_2O$, is withdrawn from the washing water of the red muds between the washing plant and the dilution tank, after attack. The weight ratio

Figure 4:
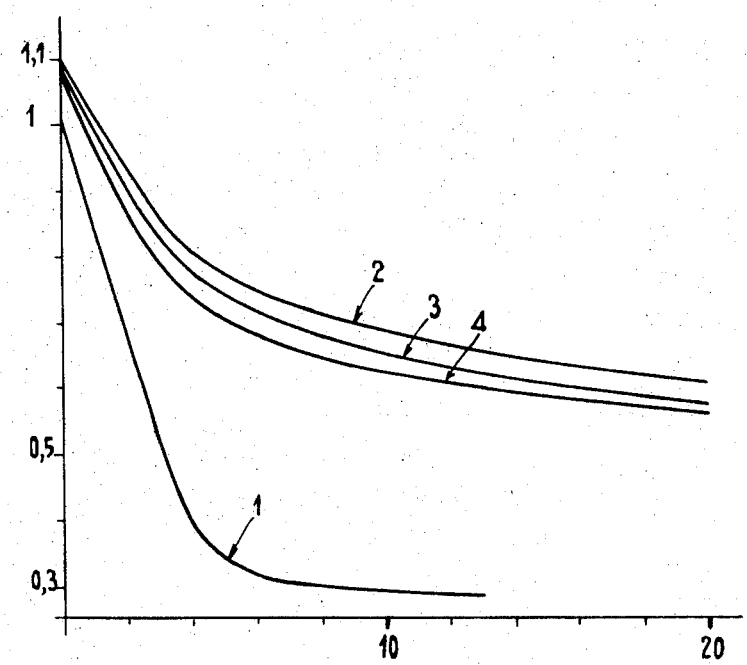

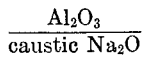

is 1.15. This liquid is circulated continuously at a temperature of 40° C. through a series of decomposer tanks. At the entry to the first tank, 7 grams of alumina gel per liter of liquid are added, or 0.840 gram of $Al_2O_3$. The mean residence time of the suspension in the assembly of the decomposer battery is 18 hours. Hydroxide grains having a dimension within the range of 1.3 to 2 microns obtained. The quantity of hydroxide obtained corresponds to 51 kg. of alumina, or 62 times the quantity of alumina introduced in gel form. The curve 1 of FIG. 4 represents the kinetics of the decomposition of the aluminate by the alumina gel.

Despite its extreme fineness but because of the uniformity in the dimension of the grains, the hydrate produced in this way is very easy to filter. After filtration all of this hydroxide is used for seeding the continuous decomposition of 2.74 cubic meters of rich aluminate solution in a battery of decomposers arranged in a series in a first stage of decomposition. The solution to be decomposed contains 162 grams of caustic $Na_2O$ and the weight ratio

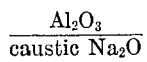

is 1.07.

In this first stage, as in the following stages, the temperature of the suspension is maintained at 50° C. and the mean residence time is 30 hours. The hydroxide mass collected at the end of the first stage corresponds to 277 kg. of alumina ($Al_2O_3$) or 5.43 times that of the seed. 95% of this mass is formed of grains having a diameter between 2 and 8 microns. This hydrate is easily separated from the decomposed liquor and the latter is returned to the bauxite-attacking circuit.

All of the alumina collected in the first stage is used for seeding the decomposition of a new fraction of rich solution in the second decomposer stage.

3.78 cubic meters of a solution containing 161 grams per liter of caustic $Na_2O$ and a caustic soda weight ratio of 1.08 are treated in the second stage.

The conditions, as regards temperature and duration, are the same as in the first stage. Trihydrate is obtained at the end of the second stage corresponding to 623 kg. of $Al_2O_3$ or 2.25 times the mass of the seed crystal fed to the second stage. 90% of this mass are formed of grains having a diameter between 4 and 9 microns.

All of the alumina obtained in the second stage is used for seeding the decomposition of a new fraction of rich solution in the third and last decomposer stage. 4.57 cubic meters of solution containing 164 grams per liter of caustic $Na_2O$ and a caustic soda weight ratio of 1.055 are treated in the third stage. The conditions, as regards temperature and residence time are the same as in the two preceding stages. The hydrate collected at the outlet from the last stage corresponds to one ton of alumina ($Al_2O_3$), or 1.61 times the quantity of seed at the first stage. 95% of this quantity are formed of grains having a diameter which is between 5 and 18 microns.

The curves 2, 3 and 4 of FIG. 4 represent the decomposition kinetics of each of the stages 1, 2 and 3, respectively. This example shows that 825 grams of alumina in the form of starting gel are sufficient to produce one ton of alumina ($Al_2O_3$). It was necessary to subject to decomposition 0.98 cubic meter of dilute liquor originating from the first washing stage of the muds, then 2.74+3.78 +4.57, or 11.09 cubic meters of rich, diluted, decanted and filtered aluminate solution.

To obtain one metric ton of alumina, it was necessary only to filter 51+277+623+1000, or 1951 kg. of alumina ($Al_2O_3$), in trihydrate form. This represents a very considerable improvement in the volume of decomposers, in filtering installations and amount of immobilized alumina by comparison with the processes of the prior art.

The comparison between these examples will illustrate that the grain size of the alumina obtained is a function of the initial proportion of gel used in that the trihydrate grains become larger as the proportion of gel becomes smaller.

It will be apparent from the foregoing that there is provided an improved process for the production of alumina from the aluminate obtained by the Bayer process and that considerable savings are achieved not only in the amount of equipment, time and materials, but also in the uniformity of the alumina grains that are produced.

It will be understood that changes may be made in the details of arrangement and operation without departing from the spirit of the invention, especially as defined in the following claims.

We claim:
1. The process for the manufacture of aluminum trihydrate from solutions of sodium aluminate obtained by leaching bauxite with alkaline solutions comprising preparing fine aluminum trihydrate seed crystals by decomposing a dilute solution of sodium aluminate in the presence of alumina gel, decomposing a first portion of a second solution of sodium aluminate in the presence of seed crystals separated from the previous decomposition, separating the crystals of trihydrate from said first portion subjected to decomposition, continuing the use of aluminum trihydrate crystals separated from a previous decomposition with a fresh portion of solution of sodium aluminate until grains of trihydrate of the desired dimension are secured, and then separating as the product the aluminum trihydrate crystals from the last portion of the sodium aluminate solution subjected to decomposition.

2. The process as claimed in claim 1 in which said second solution of sodium aluminate is a concentrated solution of sodium aluminate.

3. The process as claimed in claim 2 in which the amount of sodium aluminate solution increases with each subsequent decomposition.

4. The process as claimed in claim 1 in which the dilute solution from which the initial seed crystals are prepared in the presence of alumina gel is derived from the wash of the red muds following leaching by the Bayer process.

5. The process as claimed in claim 1 in which the dilute solution from which the initial seed crystals are prepared in the presence of alumina gel contains 50 to 100 grams $Na_2O$ per liter and 50 to 110 grams of $Al_2O_3$ per liter.

6. The process as claimed in claim 1 in which the alumina gel is present in an amount within the range of 0.05 to 1.2 grams of $Al_2O_3$ per liter of solution.

7. The process as claimed in claim 1 in which the alumina gel is present in an amount within the range of 0.1 to 0.8 gram of $Al_2O_3$ per liter of solution.

8. The process as claimed in claim 1 in which each decomposition comprises a cascade of containers and which comprises circulating the suspension of sodium aluminate and crystals from one container to the next with constant agitation.

9. The process as claimed in claim 1 in which the liquors remaining after separation of the trihydrate crystals are returned to make up a portion of the alkaline solution for leaching bauxite.

10. The process as claimed in claim 1 in which the mean residence time in each decomposition is within the range of 10 to 100 hours.

11. The process as claimed in claim 1 in which the mean residence time in each decomposition is within the range of 30 to 50 hours.

12. The process as claimed in claim 1 in which the decomposition is carried out with the materials at a temperature within the range of 30°–70° C.

13. The process as claimed in claim 1 in which the decomposition is carried out with the materials at a temperature within the range of 45°–50° C.

14. The process as claimed in claim 1 in which the mean residence time in each decomposition is within the range of 10 to 100 hours and in which the decomposition is carried out at a temperature within the range of 30°–70° C.

References Cited

UNITED STATES PATENTS

| | | | |
|---|---|---|---|
| 3,480,388 | 11/1969 | Michel | 23—143 |
| 2,707,669 | 5/1955 | Houston et al. | 23—143 |

FOREIGN PATENTS

| | | | |
|---|---|---|---|
| 663,459 | 12/1951 | Great Britain | 23—143 |

EDWARD STERN, Primary Examiner

U.S. Cl. X.R.

23—52